(12) United States Patent
Milard et al.

(10) Patent No.: US 11,856,079 B2
(45) Date of Patent: Dec. 26, 2023

(54) OPEN SYSTEMS INTERCONNECTION LAYER 1 INTERFACE FOR VECTORIZED PHYSICAL DOWNLINK CHANNEL ENCODERS

(71) Applicant: Telefonaktiebolaget LM Ericsson (publ), Stockholm (SE)

(72) Inventors: Christophe Milard, Spånga (SE); Edgard Fiallos, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 107 days.

(21) Appl. No.: 17/616,805

(22) PCT Filed: Jun. 28, 2019

(86) PCT No.: PCT/IB2019/055522
§ 371 (c)(1),
(2) Date: Dec. 6, 2021

(87) PCT Pub. No.: WO2020/260932
PCT Pub. Date: Dec. 30, 2020

(65) Prior Publication Data
US 2022/0311841 A1    Sep. 29, 2022

(51) Int. Cl.
*H04L 29/08*    (2006.01)
*H04L 1/00*    (2006.01)
*H04L 69/321*    (2022.01)

(52) U.S. Cl.
CPC .......... *H04L 69/321* (2013.01); *H04L 1/0041* (2013.01)

(58) Field of Classification Search
CPC ......... H04L 69/26; H04L 69/30; H04L 69/32; H04L 69/321; H04L 69/322–324
See application file for complete search history.

(56) References Cited

U.S. PATENT DOCUMENTS

2005/0190719 A1* 9/2005 Lee .......................... H04L 9/40
370/328
2007/0248025 A1* 10/2007 Phan ..................... H04L 47/365
370/252

(Continued)

OTHER PUBLICATIONS

International Search Report and Written Opinion dated Mar. 23, 2020 issued in PCT Application No. PCT/IB2019/055522, consisting of 12 pages.

(Continued)

*Primary Examiner* — Boris D Grijalva Lobos
(74) *Attorney, Agent, or Firm* — Christopher & Weisberg, P.A.

(57) ABSTRACT

Apparatuses and methods are disclosed for optimizing an L2-L1 interface. In some embodiments, a method for a network node includes grouping, at an open systems interconnection, OSI, layer 2, L2, codeblocks, CBs, based at least in part on a hardware property associated with an OSI layer 1, L1, processing engine; and sending the grouped CBs to the OSI L1 processing engine. In some embodiments, a method for a network node includes receiving, by an open systems interconnection, OSI, layer 1, L1, processing engine, a group of codeblocks, CBs, the CBs being grouped together based at least in part on a hardware property associated with the OSI L1 processing engine; and performing CB group-level encoding on at least the received group of CBs.

24 Claims, 7 Drawing Sheets

(56) References Cited

U.S. PATENT DOCUMENTS

| | | | |
|---|---|---|---|
| 2014/0126659 A1* | 5/2014 | Srinivasa | H04L 1/0042 |
| | | | 375/260 |
| 2018/0159707 A1* | 6/2018 | Onggosanusi | H04L 1/0025 |
| 2020/0084662 A1* | 3/2020 | Ramos | H04W 28/0278 |
| 2020/0295873 A1* | 9/2020 | Jayasinghe | H04L 1/0009 |
| 2020/0304231 A1* | 9/2020 | Wu | H04L 1/0057 |
| 2021/0377108 A1* | 12/2021 | Cho | H04L 41/0896 |
| 2022/0086810 A1* | 3/2022 | Wang | H04L 1/0016 |
| 2022/0094477 A1* | 3/2022 | Chen | H04L 1/0083 |

OTHER PUBLICATIONS

Sudhir Srinivasa et al., 11ac 80MGz Transmission Flow; IEEE 802.11-10/0548r0, May 10, 2010, consisting of 19 pages.

Bgpp TS 36.211 V15.6.0 (Jun. 2019) 3rd Generation Partnership Project; Technical Specification Group Radio Access Network; Evolved Universal Terrestrial Radio Access (E-UTRA); Physical Channels and Modulation (Release 15), consisting of 239 pages.

3GPP TS 38.211 V15.6.0 (Jun. 2019) 3rd Generation Partnership Project; Technical Specification Group Radio Access Network; NR; Physical Channels and Modulation (Release 15), consisting of 97 pages.

Communication Pursuant to Article 94(3) EPC dated Jun. 22, 2023 issued in European Patent Application No. 19 740 426.2, consisting of 6 pages.

Anonymous: "OSI Model—Wikipedia" XP055816999; Aug. 8, 2016, consisting of 7 pages.

* cited by examiner

OPEN SYSTEMS INTERCONNECTION LAYER 1 INTERFACE FOR VECTORIZED PHYSICAL DOWNLINK CHANNEL ENCODERS

CROSS-REFERENCE TO RELATED APPLICATIONS

This application is a Submission Under 35 U.S.C. § 371 for U.S. National Stage Patent Application of International Application Number: PCT/IB2019/055522, filed Jun. 28, 2019 entitled "OPEN SYSTEMS INTERCONNECTION LAYER 1 INTERFACE FOR VECTORIZED PHYSICAL DOWNLINK CHANNEL ENCODERS," the entirety of which is incorporated herein by reference.

TECHNICAL FIELD

Wireless communication and in particular, an optimized open systems interconnection (OSI) layer 1 (L1) interface for vectorized Physical Downlink Channel encoders.

BACKGROUND

Figure 1:
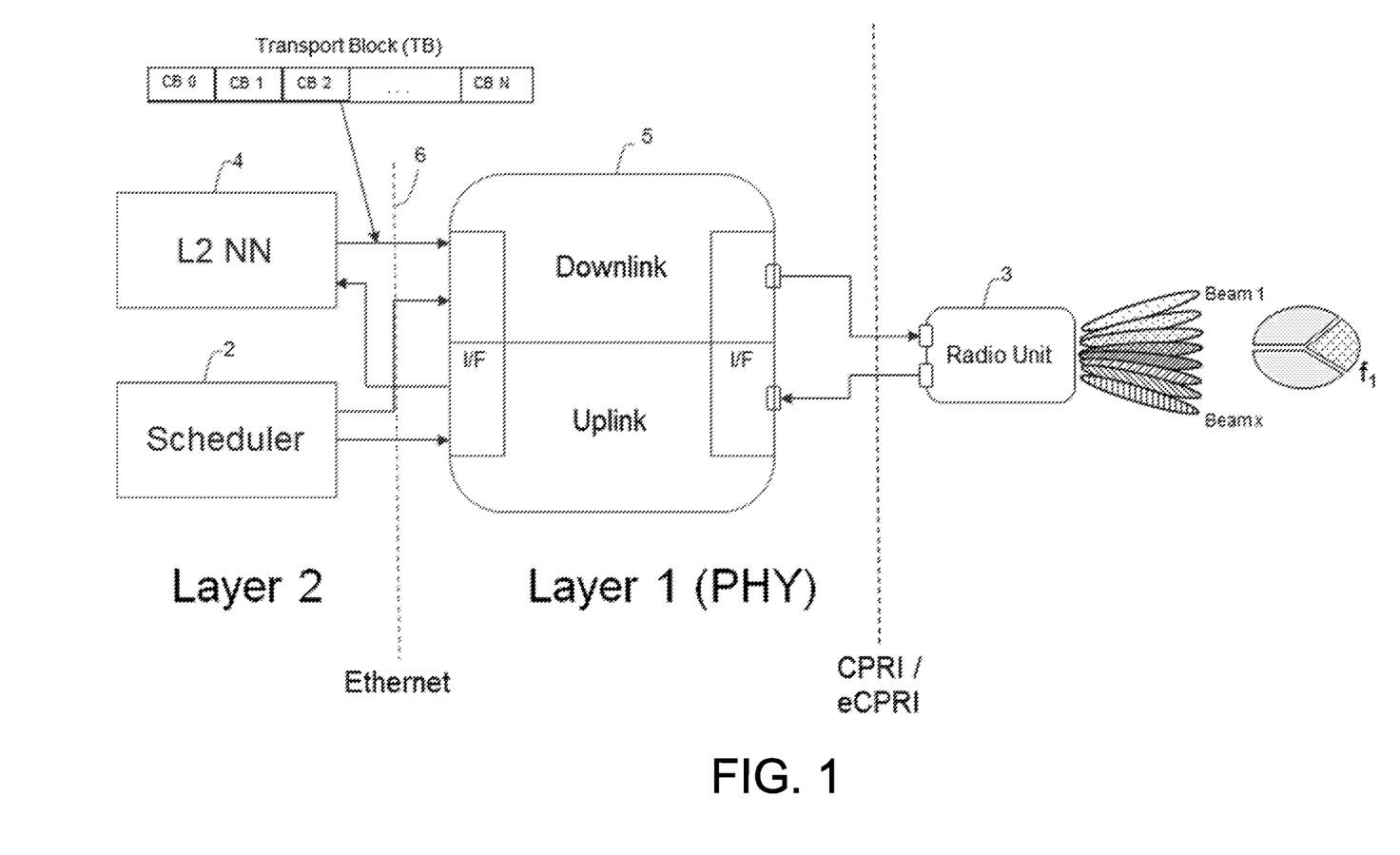
FIG. 1 illustrates an example of a high level view of the lower layers of a base station.

As wireless standards have evolved, the amount of data being transported across layers is increasing exponentially. For instance, in $3^{rd}$ Generation Partnership Project (3GPP) Long Term Evolution (LTE) most commercial systems can support OSI Layer 2 (hereinafter "L2" or "Layer 2") to OSI Layer 1 (hereinafter "L1" or "Layer 1") data rates in the order of Megabits per second (Mbps), while in 3GPP New Radio (NR) L2 to L1 data rates are in the order of Gigabits per second (Gpbs). FIG. 1 depicts an example system including a scheduler 2, a radio unit (RU) 3, and an OSI L2 network node 4 and an OSI L1 network node 5 in communication over a connection 6. Although the connection 6 is shown as an Ethernet connection in FIG. 1, it should be understood that other types of connections may be used instead. As depicted in FIG. 1, the unit of data exchanged from OSI L2 network node 4 to OSI L1 network node 5 is a Transport Block (TB). Currently, LTE products (and early NR versions) are also using the TB as the unit of data transfer for every Transmission Time Interval (TTI). Thus far this approach may have worked adequately; however, because the size of the TB is increased in NR, this creates an overall latency budget problem since Layer 1 may be required to wait for a larger amount of information from Layer 2, as compared to TB size(s) in LTE.

The subsystems relevant to this problem include L2 Media Access Control (MAC) and the Downlink Shared Data Channel. In a typical design, OSI L2 network node 4 is responsible for delivering TBs to OSI L1 network node 5, where each TB would be segmented into Code Blocks (CBs). Each of these CBs are then encoded by OSI L1 network node 5 and delivered as modulated waveforms to the radio unit 3 (RU) via e.g., a Common Public Radio Interface (CPRI) or enhanced CPRI (eCPRI) interface. The RU 3 is dedicated to performing filtering and other waveform processing to feed one or many co-located antenna equipment.

The data transfer rate between the digital unit (DU) (which may include OSI L2 network node 4 and an OSI L1 network node 5) and the RU 3 is generally governed by the Transmission Time Interval (TTI), such as per $3^{rd}$ Generation Partnership Project (3GPP) Standard definitions (Technical Specification (TS) 36.211, also known as $4^{th}$ Generation or 4G). For instance, the most typical data transfer unit is one Orthogonal Frequency Division Multiplexing (OFDM) symbol (approximately $\frac{1}{14}$ millisecond (mS)) which implies that the DU should obey a processing deadline well below the 100 microsecond (uS) range. However, the arrival of $5^{th}$ Generation (also called NR or 5G) (TS 38.211) has introduced new lengths for the OFDM symbols which are designed to match different bandwidth deployments, propagation models and types of services. For example, 5G NR defines symbol lengths that range from 71 uS (known as numerology 0) to as short as 4.2 uS (known as numerology 4). As the numerology increases, the length of the TTI decreases hence imposing further challenges on the latency budget.

SUMMARY

Some embodiments advantageously provide methods and apparatuses for an optimized open systems interconnection (OSI) layer 1 (L1) interface for vectorized Physical Downlink Channel encoders that may advantageously reduce processing latency.

According to one aspect of the present disclosure, a method for a network node is provided. The method includes grouping, at an open systems interconnection, OSI, layer 2, L2, codeblocks, CBs, based at least in part on a hardware property associated with an OSI layer 1, L1, processing engine. The method includes sending the grouped CBs to the OSI L1 processing engine.

In some embodiments of this aspect, the method further includes receiving an indication of how to group the CBs; and the grouping the CBs further includes grouping the CBs at the OSI L2 based at least in part on the received indication. In some embodiments of this aspect, the method further includes receiving an indication of a maximum number of CBs to be grouped together in a single CB group; and the grouping the CBs further includes grouping a number of CBs together, the number of CBs grouped together based at least in part on the received indication. In some embodiments of this aspect, the hardware property includes a vectorization factor of the OSI L1 processing engine.

In some embodiments of this aspect, the hardware property is associated with how many CBs matching at least one grouping criteria can be processed concurrently by the OSI L1 processing engine. In some embodiments of this aspect, the method further includes determining which of the CBs out of a plurality of CBs in a transport block, TB, can be grouped together for sending to the OSI L1 processing engine. In some embodiments of this aspect, determining which of the CBs out of the plurality of CBs in the TB can be grouped together for sending to the OSI L1 processing engine further includes: determining which of the CBs correspond to a user equipment, UE; and the grouping the CBs further includes grouping the determined CBs corresponding to the UE together for sending to the OSI L1 processing engine. In some embodiments, sending the grouped CBs to the OSI L1 processing engine further includes sending the grouped CBs to the OSI L1 processing engine for CB group-level encoding.

According to another aspect of the present disclosure, a method for a network node is provided. The method includes receiving, by an open systems interconnection, OSI, layer 1, L1, processing engine, a group of codeblocks, CBs, the CBs being grouped together based at least in part on a hardware property associated with the OSI L1 processing engine. The method includes performing CB group-level encoding on at least the received group of CBs.

In some embodiments of this aspect, the method further includes sending an indication to an OSI layer 2, L2, node, the group of CBs being grouped together based at least in part on the indication. In some embodiments of this aspect, the indication indicates at least one of: a maximum number of CBs to be grouped together in a single CB group; how many CBs matching at least one grouping criteria can be processed concurrently by the OSI L1 processing engine; and a vectorization factor of the OSI L1 processing engine. In some embodiments of this aspect, performing CB group-level encoding on at least the received group of CBs further includes performing the CB group-level encoding on each of a plurality of CB groups in parallel. In some embodiments of this aspect, each CB group of the plurality of CB groups is encoded by a single processing hardware element.

According to yet another aspect of the present disclosure, a network node including processing circuitry is provided. The processing circuitry is configured to cause the network node to group, at open systems interconnection, OSI, layer 2, L2, codeblocks, CBs, based at least in part on a hardware property associated with an OSI layer 1, L1, processing engine; and send the grouped CBs to the OSI L1 processing engine.

In some embodiments of this aspect, the processing circuitry is further configured to cause the network node to receive an indication of how to group the CBs; and group the CBs by being configured to group the CBs at the OSI L2 based at least in part on the received indication. In some embodiments of this aspect, the processing circuitry is further configured to cause the network node to receive an indication of a maximum number of CBs to be grouped together in a single CB group; and group the CBs by being configured to group a number of CBs together, the number of CBs grouped together based at least in part on the received indication. In some embodiments of this aspect, the hardware property includes a vectorization factor of the OSI L1 processing engine. In some embodiments of this aspect, the hardware property is associated with how many CBs matching at least one grouping criteria can be processed concurrently by the OSI L1 processing engine. In some embodiments of this aspect, the processing circuitry is further configured to cause the network node to determine which of the CBs out of a plurality of CBs in a transport block, TB, can be grouped together for sending to the OSI L1 processing engine.

In some embodiments of this aspect, the processing circuitry is further configured to cause the network node to determine which of the CBs out of the plurality of CBs in the TB can be grouped together by being configured to determine which of the CBs correspond to a user equipment, UE; and group the CBs by being configured to group the determined CBs corresponding to the UE together for sending to the OSI L1 processing engine. In some embodiments of this aspect, the processing circuitry is further configured to cause the network node to send the grouped CBs to the OSI L1 processing engine by being further configured to cause the network node to send the grouped CBs to the OSI L1 processing engine for CB group-level encoding.

According to yet another aspect of the present disclosure, a network node including processing circuitry is provided. The processing circuitry is configured to cause the network node to receive, by an open systems interconnection, OSI, layer 1, L1, processing engine, a group of codeblocks, CBs, the CBs being grouped together based at least in part on a hardware property associated with the OSI L1 processing engine; and perform CB group-level encoding on at least the received group of CBs.

In some embodiments of this aspect, the processing circuitry is further configured to cause the network node to send an indication to an OSI layer 2, L2, node, the group of CBs being grouped together based at least in part on the indication. In some embodiments of this aspect, the indication indicates at least one of: a maximum number of CBs to be grouped together in a single CB group; how many CBs matching at least one grouping criteria can be processed concurrently by the OSI L1 processing engine; and a vectorization factor of the OSI L1 processing engine. In some embodiments of this aspect, the processing circuitry is further configured to cause the network node to perform CB group-level encoding on at least the received group of CBs by being configured to cause the network node to perform the CB group-level encoding on each of a plurality of CB groups in parallel. In some embodiments of this aspect, each CB group of the plurality of CB groups is encoded by a single processing hardware element.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 2:
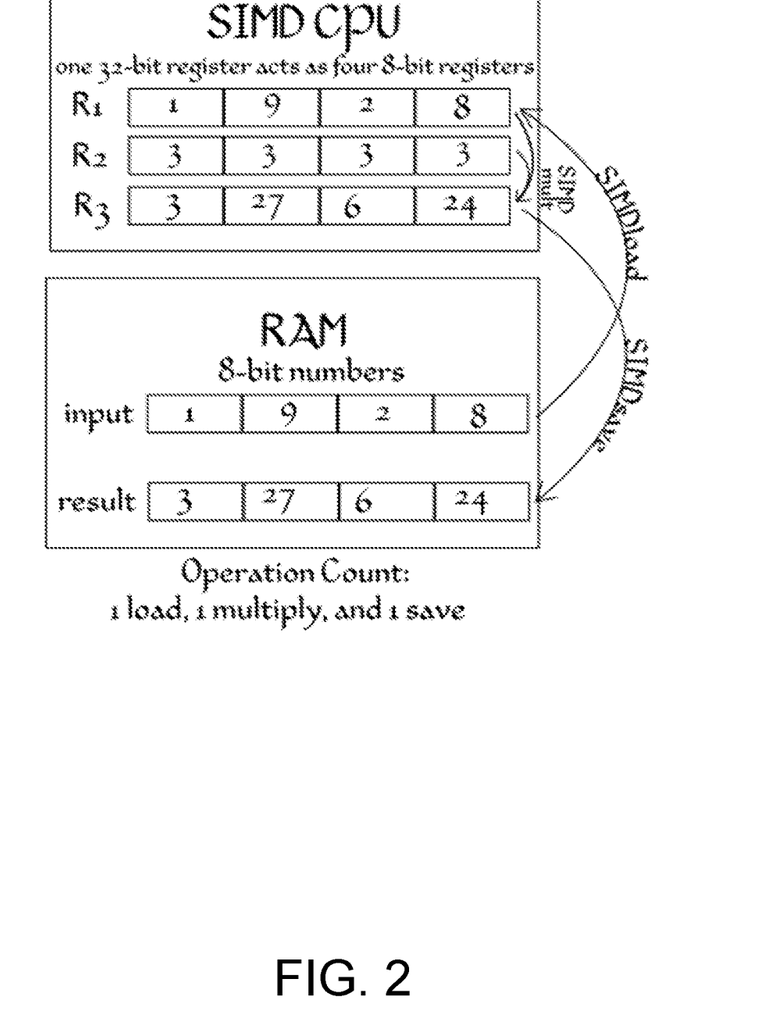
FIG. 2 illustrates an example of Single Instruction Multiple Data (SIMD)

As the physical layer (PHY) processing requirements increase with growing computational demand, many hardware platforms offer the possibility of processing multiple data elements in a single processing cycle (e.g., CPU cycle), provided that e.g., the same operation is performed on each of the multiple data elements. This feature is also referred to as Single Instruction Multiple Data (SIMD). FIG. 2 illustrates an example of SIMD operation based on 32-bit registers.

In the example in FIG. 2, each of $R_1$, $R_2$ and $R_3$ in the SIMD central processing unit (CPU) represents a 32-bit register acting as four 8-bit registers. FIG. 2 illustrates an example of a single operation, multiplication in this case, is being applied to 4 different data elements at once (1×3, 9×3, 2×3, 8×4). Therefore, the SIMD CPU is able to perform 4 multiplication operations on 4 different data elements in one CPU cycle. This type of operation may also be referred to as 'vectorized' operation since the operands can be considered vectors (i.e., an array of scalar values). As used in this disclosure, the vector size may be referred to as the 'vectorization factor'. In this example, the vectorization factor is equal to 4.

One example embodiment to address the latency problem is to change the communication data element (e.g., unit of data exchanged from L2 to L1) from TB s to CBs. Advantageously, this would allow L1 (also referred to in the art as the physical layer or PHY) to maximize the parallelization of CBs. Such parallelization may occur at one or more of the following two levels:

Thread Level: in this case, an entire CB can be assigned to a single processing hardware element (e.g., one CPU/core in a multi-core system).

Instruction Level: in this case, multiple data elements (e.g., groups of bits) can be processed in a single clock cycle, such as by using SIMD discussed above. In this case, it may be advantageous to process multiple CBs at once. This type of processing is also referred to as 'Vector Processing'.

In some embodiments, L2 may create groups of CBs to send to L1. The grouping of CBs together may be configured to match and/or the be based on a specific vectorization factor of a given processor in the L1 encoder (e.g., vectorization factor of 2, 4, 8, or 16, etc.).

Before describing in detail exemplary embodiments, it is noted that the embodiments reside primarily in combinations of apparatus components and processing steps related to optimized open systems interconnection (OSI) layer 1 (L1) interface for vectorized Physical Downlink Channel (such as a Physical Downlink Shared Channel (PDSCH)) encoders. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network, such as an OSI L1 network node and/or an OSI L2 network node. The network node may comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, integrated access and backhaul (IAB), donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment.

In some embodiments, the non-limiting terms user equipment (UE) or wireless device (WD) are used interchangeably. The UE herein can be any type of wireless device capable of communicating with a network node or another WD over radio signals, such as wireless device (WD). The UE may also be a radio communication device, target device, device to device (D2D) UE, machine type UE or UE capable of machine to machine communication (M2M), low-cost and/or low-complexity WD, a sensor equipped with UE, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

In some embodiments, the phrase "CBs matching at least one grouping criteria" is intended to indicate CBs that have and/or share the same characteristic, quality, property, condition or association, such as for example, CBs that are intended for the same UE/WD, or CBs that can otherwise be encoded and/or processed by e.g., OSI L1 processing engine concurrently.

In some embodiments, the phrase "grouping criteria" is intended to indicate a characteristic, quality, property, condition or association of a CB that is used as a basis for grouping the CB with other CBs according to the techniques disclosed herein.

In some embodiments, the phrase "hardware property" is intended broadly to mean to any hardware property of the OSI L1 processing engine, such as, a vectorization factor and/or any other information that indicates a processing capability, such as a vector processing capability, of the processing hardware of the OSI L1 network node.

In some embodiments, the phrase "OSI L1 processing engine" means the processing hardware and/or processing circuitry of the OSI L1 network node, such as the processing hardware (e.g., multi-core processor, multi-processor core, CPU, etc.) used for L1 encoding.

In some embodiments, the phrase "processing hardware element" means a processing unit and/or processing element of the OSI L1 processing engine (which may include multiple processing elements), such as, for example, a core of a multi-core processor, where the multi-core processor is the OSI L1 processing engine. Processing hardware and/or processing circuitry can have many different types of arrangements and configurations, therefore, the terms "processing hardware element" and "OSI L1 processing engine" are not limited to the particular examples described herein.

In some embodiments, the phrase "vectorization factor" is used to indicate how many operations can be performed concurrently (e.g., in one clock cycle and/or CPU cycle) by a processing hardware element (e.g., SIMD core) on different data elements.

An indication (e.g., an indication of how to group CBs, an indication of a maximum number of CBs to be grouped together in a single group, an indication of a vectorization factor, etc.) generally may explicitly and/or implicitly indicate the information it represents and/or indicates. Implicit indication may for example be based on position and/or resource used for transmission. Explicit indication may for example include or represent the information to be indicated. Explicit indication may for example be based on a parametrization with one or more parameters, and/or one or more index or indices corresponding to a table, and/or one or more bit patterns representing the information.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a network node may be distributed over a plurality of network nodes. In other words, it is contemplated that the functions of the network node described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 3:
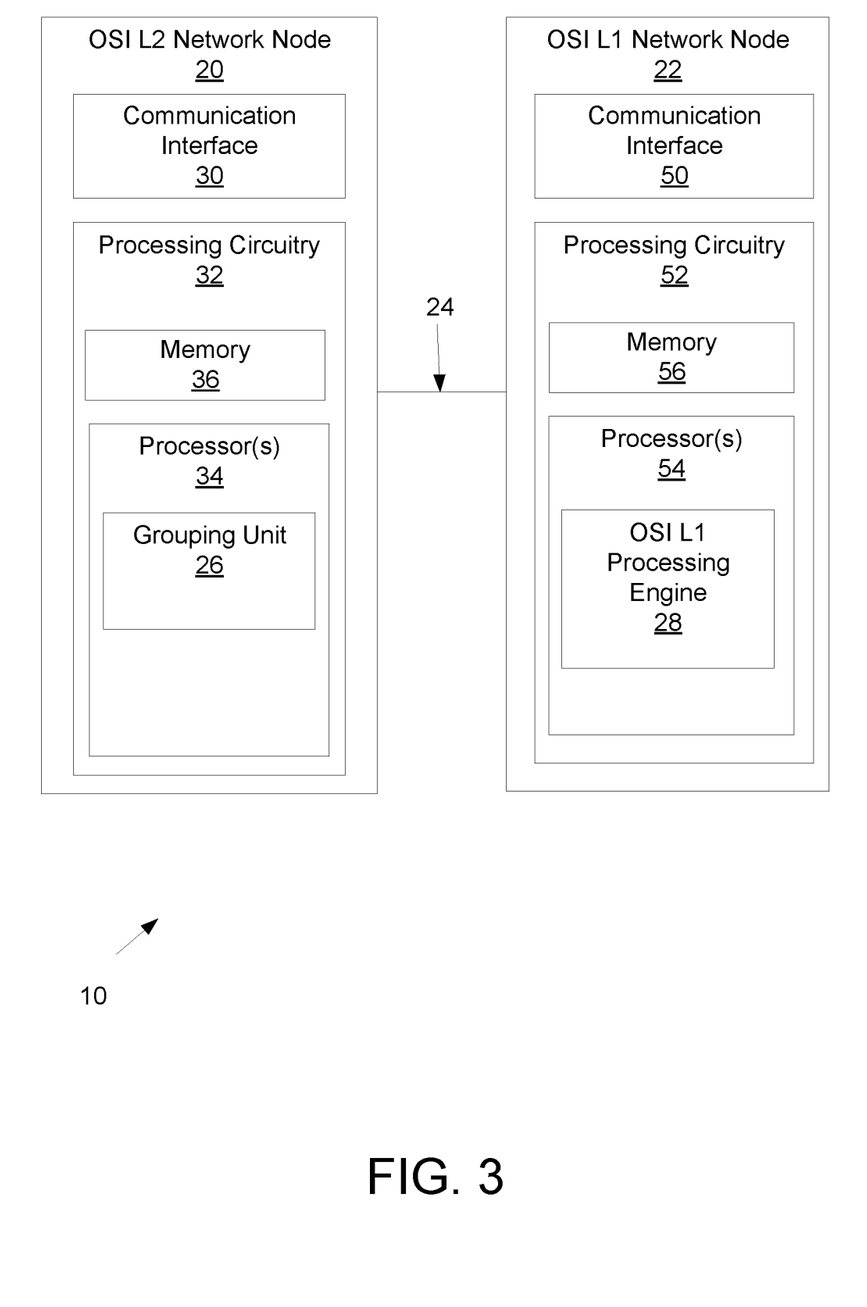
FIG. 3 is a block diagram illustrating an example of a communication system including an OSI L1 node in communication with an OSI L2 node according to one embodiment of the present disclosure.

Referring again to the drawing figures, in which like elements are referred to by like reference numerals, there is shown in FIG. 3 a schematic diagram of an example of a communication system 10, according to an embodiment of the present disclosure, such as a 3GPP-type cellular network that may support standards such as LTE and/or NR (5G), which comprises an OSI L2 network node 20 and an OSI L1 network node 22. The OSI L2 network node 20 is in communication with the OSI L1 network node 22 such as via a connection 6 (e.g., an L1-L2 interface, Ethernet connection, etc.). In some embodiments, the OSI L2 network node 20 and OSI L1 network node 22 may be elements of a base station, such as, NBs, eNBs, gNBs or other types of wireless access points, each base station or wireless access point defining a corresponding coverage area for one or more UEs. The base station may be connectable to a core network over a wired and/or wireless connection. One or more UEs located in a coverage area may be configured to wirelessly connect to, be paged by, and/or receive a physical downlink channel transmission from a corresponding base station. Note that although only one OSI L2 network node 20 and one OSI L1 network node 22 are shown for convenience, the communication system 10 may include many more OSI L2 and OSI L1 nodes.

An OSI L2 network node 20 is configured to include a Grouping unit 26 which is configured to group, at open systems interconnection, OSI, layer 2, L2, codeblocks, CBs, based at least in part on a hardware property associated with an OSI layer 1, L1, processing engine 28. The Grouping unit 26 may be further configured to cause the OSI L2 network node 20 to send the grouped CBs to the OSI L1 processing engine 28.

An OSI L1 network node 22 is configured to include an OSI L1 processing engine 28 which is configured to receive a group of codeblocks, CBs, the CBs being grouped together based at least in part on a hardware property associated with the OSI L1 processing engine. The OSI L1 processing engine 28 may be further configured to perform CB group-level encoding on at least the received group of CBs Example implementations, in accordance with an embodiment, of the OSI L2 network node 20 and the OSI L1 network node 22 discussed in the preceding paragraphs will be further described with reference to FIG. 3. In a communication system 10, a OSI L2 network node 20 provided in a communication system 10 may include a communication interface 30, such as a network interface card, configured to set up and/or maintain a connection 6, such as a wired or wireless connection, with an OSI L1 network node 22 for providing an L1-L2 interface according to the techniques in the present disclosure.

In the embodiment shown, the OSI L2 network node 20 further includes processing circuitry 32. The processing circuitry 32 may include one or more processor(s) 34 and a memory 36. In particular, in addition to or instead of processor(s), such as a central processing unit(s), SIMD circuitry, multi-core processor(s), and memory 36, the processing circuitry 32 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 34 may be configured to access (e.g., write to and/or read from) the memory 36, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the OSI L2 network node 20 may further include software stored internally in, for example, memory 36, or stored in external memory (e.g., database, storage array, network storage device, etc.) accessible by the OSI L2 network node 20 via an external connection. The software may be executable by the processing circuitry 32. The processing circuitry 32 may be configured to control any of the methods and/or processes described herein and/or to cause such methods, and/or processes to be performed, e.g., by OSI L2 network node 20. Processor 34 corresponds to one or more processors 34 for performing OSI L2 network node 20 functions described herein. The memory 36 is configured to store data, programmatic software code and/or other information described herein. In some embodiments, the software may include instructions that, when executed by the processor 34 and/or processing circuitry 32, causes the processor 34 and/or processing circuitry 32 to perform the processes described herein with respect to OSI L2 network node 20. For example, processing circuitry 32 of the OSI L2 network node 20 may include Grouping unit 26 configured to perform the OSI L2 processes and/or functions described herein such as with reference to FIG. 4.

The communication system 10 further includes the OSI L1 network node 22 already referred to. The OSI L1 network node 22 may include a communication interface 50, such as a network interface card, configured to set up and/or maintain a connection 6, such as a wired or wireless connection, with an OSI L2 network node 20 for providing an L1-L2 interface according to the techniques in the present disclosure.

In the embodiment shown, the OSI L1 network node 22 further includes processing circuitry 52. The processing circuitry 52 may include one or more processor(s) 54 and a memory 56. In particular, the processor(s) 54 may include one or more of central processing unit(s), SIMD circuitry, multi-core processor(s), multi-processor cores, and/or any other type of parallel and/or vector-based processing hardware, etc. that may be used according to the techniques in this disclosure.

The processing circuitry 52 may further include integrated circuitry for processing and/or control, e.g., one or more processors and/or processor cores and/or FPGAs (Field Programmable Gate Array) and/or ASICs (Application Specific Integrated Circuitry) adapted to execute instructions. The processor(s) 54 may be configured to access (e.g., write to and/or read from) the memory 56, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the OSI L1 network node 22 may further include software stored internally in, for example, memory 56, or stored in external memory (e.g., database, storage array, network storage device, etc.) accessible by the OSI L1 network node 22 via an external connection. The software may be executable by the processing circuitry 52. The processing circuitry 52 may be configured to control any of the methods and/or processes described herein and/or to cause such methods, and/or processes to be performed, e.g., by OSI L1 network node 22. Processor 54 corresponds to one or more processors 54 for performing OSI L1 network node 22 functions described herein. The memory 56 is configured to store data, programmatic software code and/or other information described herein. In some embodiments, the software may include instructions that, when executed by the processor 54 and/or processing circuitry 52, causes the processor 54 and/or processing circuitry 52 to perform the processes described herein with respect to OSI L1 network node 22. For example, processing circuitry 52 of the OSI L1 network node 22 may include an OSI L1 processing engine 28 configured to perform the OSI L1 processes and/or functions described herein such as with reference to FIG. 5.

Although OSI L2 network node 20 and OSI L1 network node 22 are shown in FIG. 3 as separate network node devices in communication with one another via a connection 6, it should be understood that the techniques disclosed herein may be used for any OSI L2-L1 interface, such as in embodiments where OSI L2 and L1 processing is performed by a single device.

Although FIG. 3 shows a "unit" and "engine" such as Grouping unit 26, and OSI L1 processing engine 28 as being within a respective processor, it is contemplated that the unit and/or engine may be implemented such that a portion of the unit and/or engine is stored in a corresponding memory within the processing circuitry. In other words, the unit and/or engine may be implemented in hardware or in a combination of hardware and software within the processing circuitry.

Figure 4:
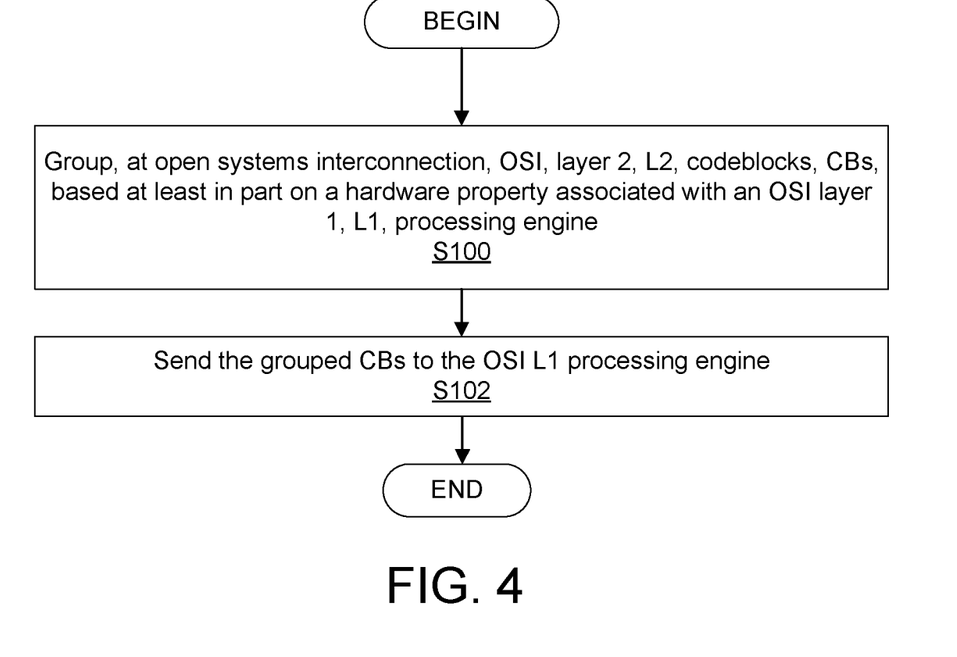
FIG. 4 is a flowchart of an exemplary method for an OSI L2 network node according to one embodiment of the present disclosure.

FIG. 4 is a flowchart of an exemplary process in an OSI L2 network node 20 for grouping CBs according to some embodiments of the present disclosure. One or more Blocks and/or functions and/or methods performed by the OSI L2 network node 20 may be performed by one or more elements of OSI L2 network node 20 such as by Grouping unit 26 in processing circuitry 32, processor 34, memory 36, communication interface 30, etc. according to the example method. The example method includes grouping (Block S100), such as via Grouping unit 26 in processing circuitry 32, processor 34, memory 36, communication interface 30, at an open systems interconnection, OSI, layer 2, L2, codeblocks, CBs, based at least in part on a hardware property associated with an OSI layer 1, L1, processing engine 28. The method includes sending (Block S102), such as via Grouping unit 26 in processing circuitry 32, processor 34, memory 36, communication interface 30, the grouped CBs to the OSI L1 processing engine.

In some embodiments, the method further includes receiving, such as via Grouping unit 26 in processing circuitry 32, processor 34, memory 36, communication interface 30, an indication of how to group the CBs; and the grouping the CBs further includes grouping the CBs at the OSI L2 based at least in part on the received indication. In some embodiments, the method further includes receiving, such as via Grouping unit 26 in processing circuitry 32, processor 34, memory 36, communication interface 30, an indication of a maximum number of CBs to be grouped together in a single CB group; and the grouping the CBs further includes grouping a number of CBs together, the number of CBs grouped together based at least in part on the received indication.

In some embodiments, the hardware property includes a vectorization factor of the OSI L1 processing engine 28. In some embodiments, the hardware property is associated with how many CBs matching at least one grouping criteria can be processed concurrently by the OSI L1 processing engine 28. In some embodiments, the method includes determining, such as via Grouping unit 26 in processing circuitry 32, processor 34, memory 36, communication interface 30, which of the CBs out of a plurality of CBs in a transport block, TB, can be grouped together for sending to the OSI L1 processing engine 28. In some embodiments, determining which of the CBs out of the plurality of CBs in the TB can be grouped together for sending to the OSI L1 processing engine further includes: determining, such as via Grouping unit 26 in processing circuitry 32, processor 34, memory 36, communication interface 30, which of the CBs correspond to a user equipment, UE; and the grouping the CBs further includes grouping the determined CBs corresponding to the UE together for sending to the OSI L1 processing engine 28. In some embodiments, sending the grouped CBs to the OSI L1 processing engine further includes sending, such as via Grouping unit 26 in processing circuitry 32, processor 34, memory 36, communication interface 30, the grouped CBs to the OSI L1 processing engine 28 for CB group-level encoding.

Figure 5:
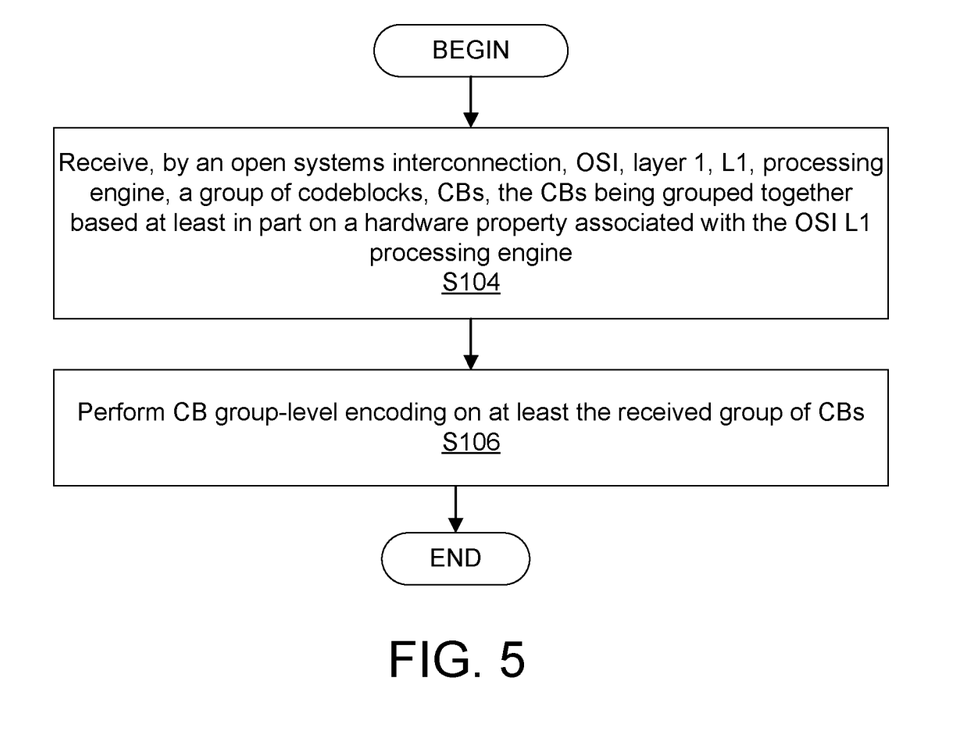
FIG. 5 a flowchart of an exemplary method for an OSI L1 network node according to one embodiment of the present disclosure.

FIG. 5 is a flowchart of an exemplary process in an OSI L1 network node 22 for L1 encoding according to some embodiments of the present disclosure. One or more Blocks and/or functions and/or methods performed by OSI L1 network node 22 may be performed by one or more elements of OSI L1 network node 22 such as by OSI L1 processing engine 28 in processing circuitry 52, processor 54, memory 56, communication interface 50, etc. The example method includes receiving (Block S104), by an open systems interconnection, OSI, layer 1, L1, processing engine 28, a group of codeblocks, CBs, the CBs being grouped together based at least in part on a hardware property associated with the OSI L1 processing engine 28. The method includes performing, such as via OSI L1 processing engine 28 in processing circuitry 52, processor 54, memory 56, communication interface 50, CB group-level encoding on at least the received group of CBs.

In some embodiments, the method includes sending, such as via OSI L1 processing engine 28 in processing circuitry 52, processor 54, memory 56, communication interface 50, an indication to an OSI layer 2, L2, node 20, the group of CBs being grouped together based at least in part on the indication. In some embodiments, the indication indicates at least one of: a maximum number of CBs to be grouped together in a single CB group; how many CBs matching at least one grouping criteria can be processed concurrently by the OSI L1 processing engine 28; and a vectorization factor of the OSI L1 processing engine 28. In some embodiments, performing CB group-level encoding on at least the received group of CBs further includes performing, such as via OSI L1 processing engine 28 in processing circuitry 52, processor 54, memory 56, communication interface 50, the CB group-level encoding on each of a plurality of CB groups in parallel. In some embodiments, each CB group of the plurality of CB groups is encoded by a single processing hardware element (e.g., a single core in a multi-core processor).

Having described arrangements for optimized OSI L2-L1 interface for vectorized physical downlink channel encoders, functions and processes are provided as follows, and which may be implemented by the OSI L2 network node 20 and/or OSI L1 network node 22.

CB-Based L2-L1 Interface

Figure 6:
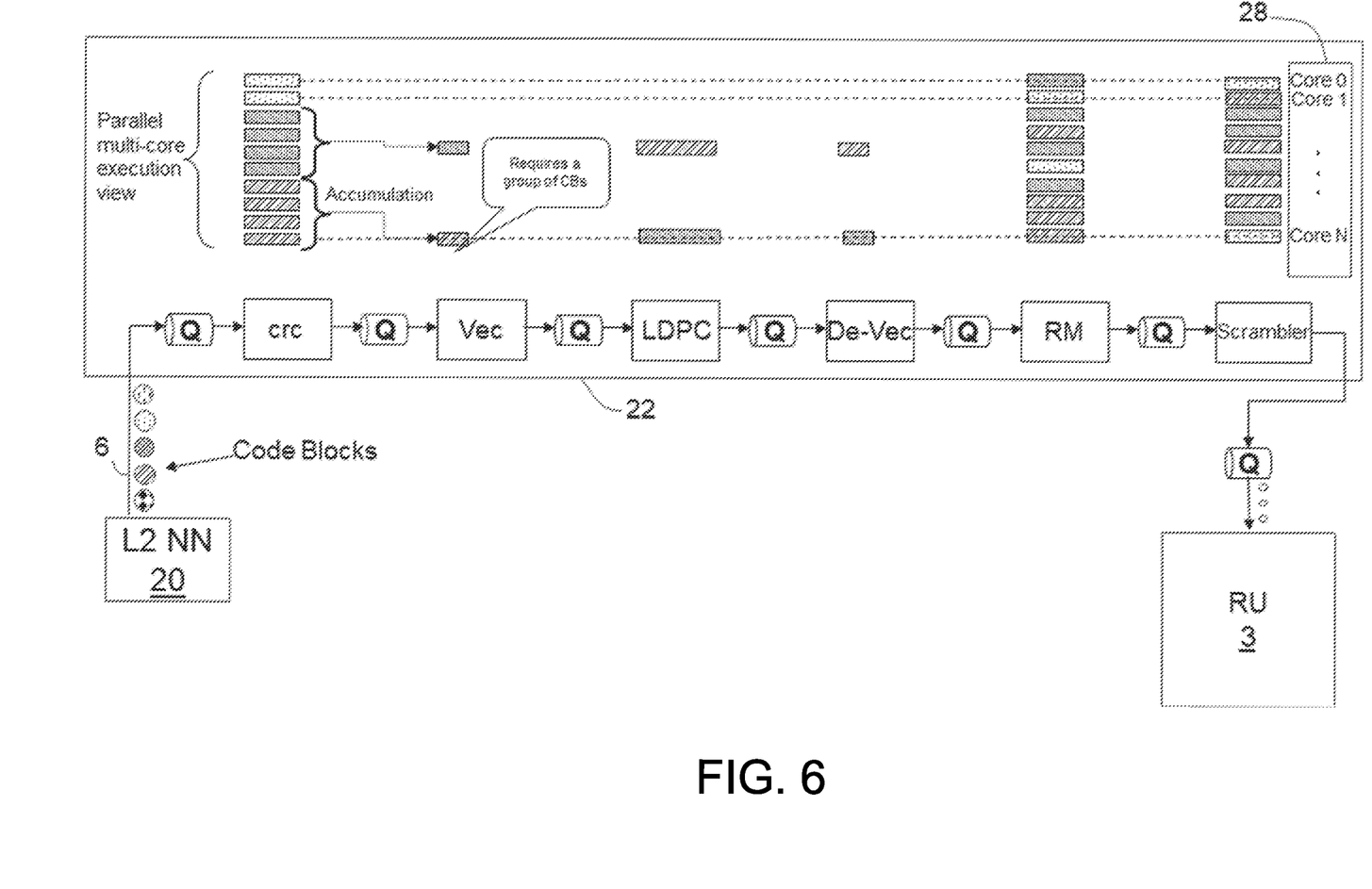
FIG. 6 is a block diagram illustrating an OSI Layer 1 encoding process using a CB-based interface to perform LDPC encoding according to one embodiment of the present disclosure.

FIG. 6 depicts an example of a CB-based L2-L1 interface that allows for usage of multi-threading, SIMD and vectorization in the L1 encoding process. As shown in FIG. 6, the OSI L2 network node 20 sends (e.g., via connection 6) separate CBs to the OSI L1 network node 22 (instead of TBs as in existing arrangements). The OSI L1 network node 22 (e.g., via OSI L1 processing engine 28) may then perform an L1 encoding process on the received CBs. The L1 encoding process may include the following steps, described in more detail below:

S202—performing cyclic redundancy check (CRC) on each CB;
S204—accumulating CBs for vector processing by an e.g., SIMD core;
S206—performing encoding (e.g., low density parity check (LDPC) encoding) on the accumulated CBs using vector processing;
S208—de-vectorizing the accumulated CBs;
S210—performing rate matching (RM);
S212—scrambling; and
S214—sending the output to the RU 3 for modulation and radio processing.

Threads for processing the CBs may be placed into a task queue (indicated by capital 'Q' in FIG. 6) by e.g., the scheduler 2. In step S202, a single hardware processing element (for example one core of cores 0-n as shown in FIG. 6) may perform CRC on each respective CB. For example, the OSI L1 processing engine 28 may be a multi-core processor including 0-N SIMD cores and each core may perform CRC on one of the received CB.

After a number of CBs have been received, in step S204, the OSI L1 network node 22 may accumulate CBs for vector processing by the SIMD cores. In the example shown, each core may have a vectorization factor of e.g., 4 and therefore be capable of performing the same operation on 4 different data elements (in this case 4 different CBs) in a single clock cycle. Thus, 4 CBs are shown in FIG. 6 as being accumulated.

Figure 8:
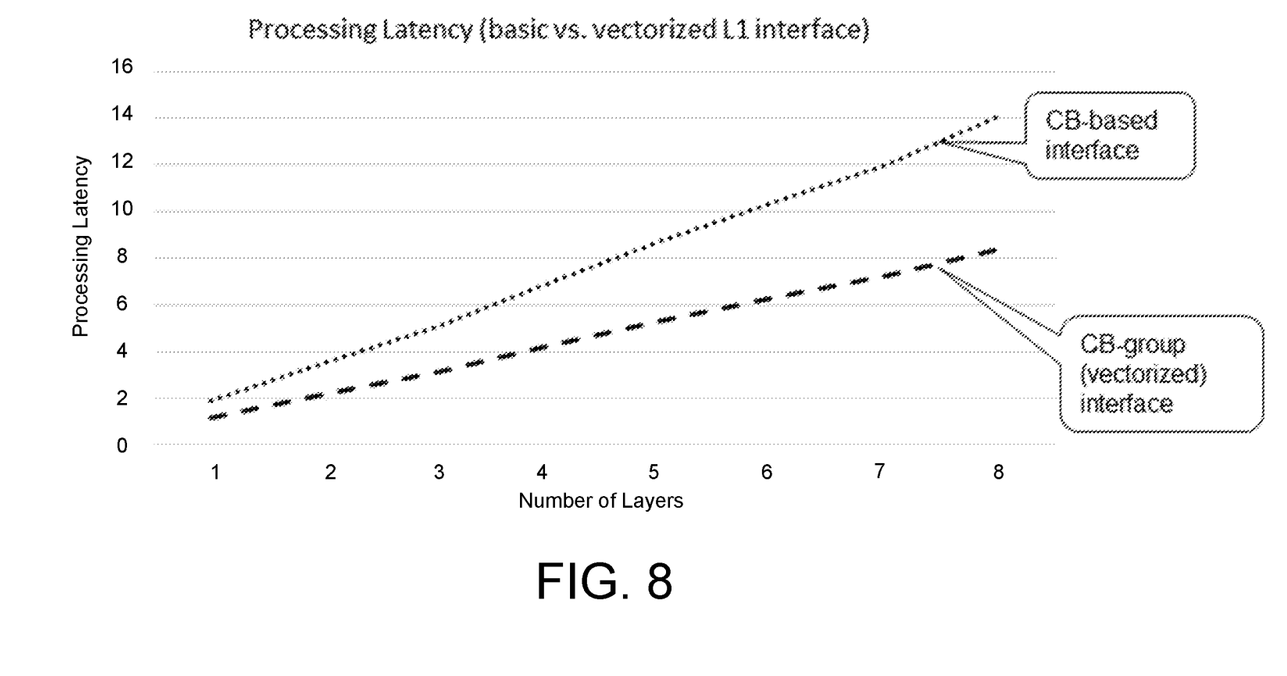
FIG. 8 is a chart illustrating example processing latency data for a CB-based interface and a CB-group vectorized interface according to some embodiments of the present disclosure.

In step S206, encoding (e.g., LDPC encoding) for 4 different CBs is performed by a single hardware processing element (e.g., SIMD core N processing 4 different CBs) in parallel. This may reduce processing latency as shown in FIG. 8, for example, by the line indicated as a CB-based interface, where, in some embodiments, the Y axis shows processing latency in e-4 seconds. In step S208, the OSI L1 network node 22 performs de-vectorization on the CBs, which may result in the scheduler 2 assigning each CB to a different core as shown in FIG. 6. In step S210, each core may perform rate matching (RM) on each corresponding CB. In step S212, each core may perform scrambling on each corresponding CB. The details for how to perform CRC, rate matching, scrambling and LDPC encoding are generally known in the art and are therefore not discussed in greater detail herein.

Notably, as can be seen by a comparison of the ordering of the shaded CBs in step S202 during CRC to the ordering of the shaded CBs in step S210 during RM and also to the ordering of the shaded CBs in step S212 during scrambling, the scheduler 2 that manages threads in the task queues (Qs) may not assign the same core to same CB for processing. Thus, the data and context for the respective CB is considered to 'hop' from one core to another, which can be inefficient.

Therefore, while the CB-based interface can provide some improvement to the latency problem, there may also be some inefficiencies in this design that can be further improved upon in other embodiments. These inefficiencies in design may include one or more of the following:

the front end of the PHY accumulates N code blocks to organize them as a vector for the efficient SIMD operation of the LDPC encoder, hence adding a costly synchronization point;
there is overhead in the queuing/de-queuing; and/or
as the data and context of the CB 'hops' from one core to another, data cache misses can inject further stalling of OSI L1 processing engine 28. A cache miss occurs when an application is unable to find requested data in cache memory of the hardware processing element (e.g., CPU, processor, or core) that the application is using/assigned to, resulting in execution delays by e.g., requiring the application to fetch the data from other cache levels, or, even worse, main memory. The reason for this 'hop' is that the concurrency framework (scheduler 2) will blindly assign the next available core since the scheduler 2 is not aware of the application context.

CB-Group Based L2-L1 Interface

Figure 7:
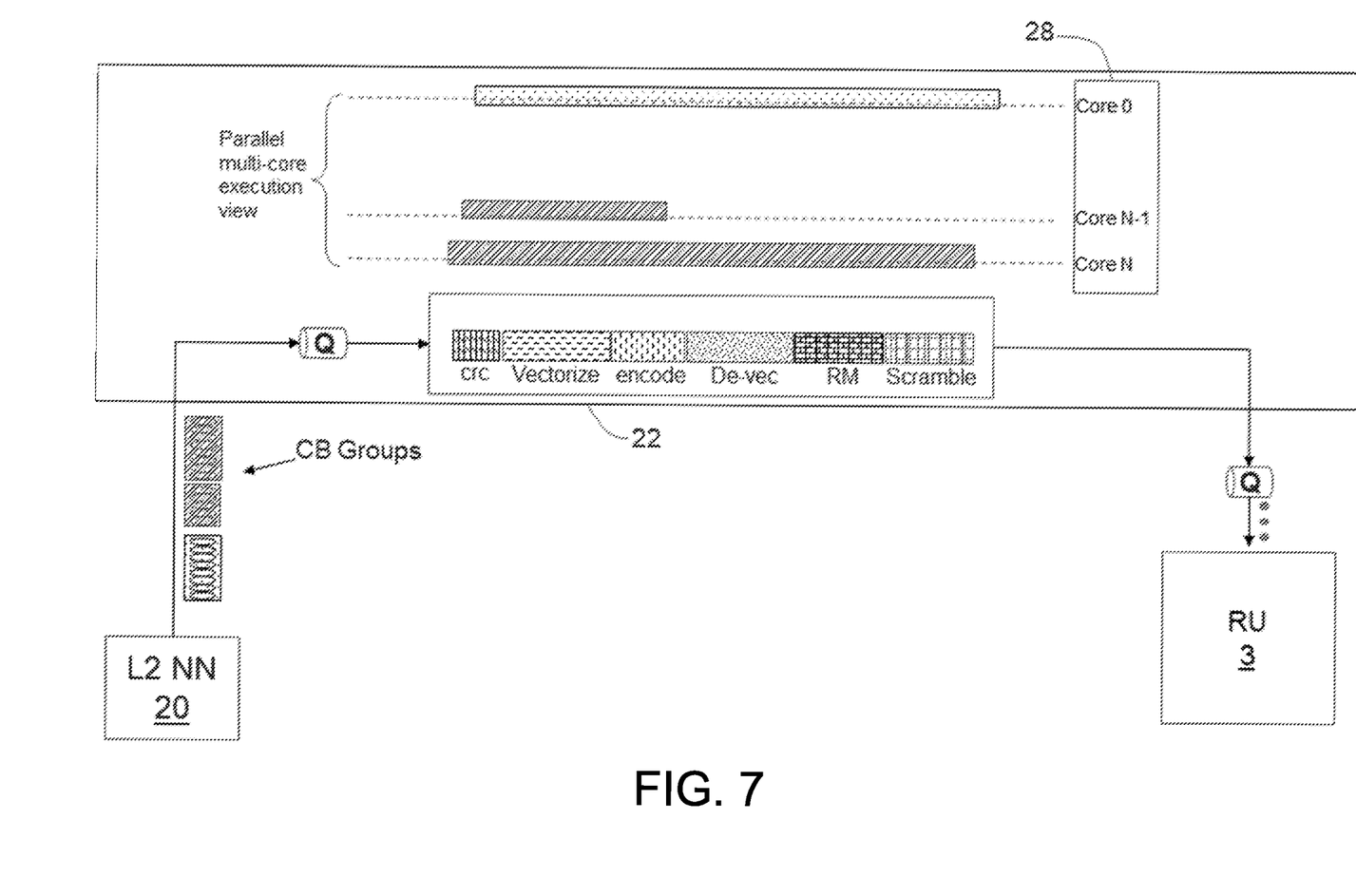
FIG. 7 is a block diagram illustrating an OSI Layer 1 encoding process using vectorization and CB-grouping to perform LDPC encoding according to another embodiment of the present disclosure.

FIG. 7 depicts an example of a CB-group based interface (I/F) and processing according to an embodiment of the present disclosure. For the CB-group based interface, the OS L2 network node 20 may be configured to create groups of CB(s) to send to the OSI L1 network node 22. The CB groups may be non-TB-based. Instead, the CB groups may be created to match a hardware property, such as the vectorization factor, of the specific OSI L1 processing engine 28 (e.g., 2, 4, 8, 16, etc.). In some embodiments, for the CB-group based interface, an entire group of CBs may be processing in a single hardware processing element (e.g., one core in the multi-core processor).

For example, as shown in FIG. 7, the OSI L2 network node 20 groups CBs together and sends the grouped CBs (e.g., via connection 6) to the OSI L1 network node 22. FIG. 7 shows 3 different CB groups being sent from OSI L2 network node 20 to OSI L1 network node 22. In some embodiments, CBs may be grouped together based on a hardware property, such as a vectorization factor of the L1 processing engine 28. For example, if the vectorization factor is 4, each CB group may include a maximum of 4 CBs; if the vectorization factor is 2, each CB group may include a maximum of 2 CBs; if the vectorization factor is 8, each CB group may include a maximum of 8 CBs. In some embodiments, an indication of the hardware property may be sent by the OSI L1 network node 22 to the OSI L2 network node 20. In some embodiments, the indication may include an indication of a maximum number of CBs to be grouped together by the OSI L2 network node 20. In some embodiments, CBs may be grouped together based on at least one grouping criteria. For example, the groups may be created based on how many CBs matching at least one grouping criteria can be processed concurrently by the OSI L1 processing engine 28. In some embodiments, the grouping criteria may include grouping CBs belonging to the same user equipment (UE) together. In some embodiments, as shown in FIG. 6, different CB groups may include a different number of CBs. For example, one CB group includes 8 CBs and another CB group includes 4 CBs. In other embodiments, the number of CBs in each CB group may be the same.

After receiving the CB group, the OSI L1 network node 22 (e.g., via OSI L1 processing engine 28) may perform an L1 encoding process on the received grouped CBs. In FIG. 7, the L1 encoding process may include the following steps, described in more detail below:

S302—performing cyclic redundancy check (CRC) for the CB group;

S304—vectorizing the CBs in the CB group for vector processing by an e.g., SIMD core;

S306—performing encoding (e.g., low density parity check (LDPC) encoding) on the CB group using vector processing;

S308—de-vectorizing the CB group;

S310—performing rate matching (RM);

S312—scrambling; and

S314—sending the output to the RU 3 for modulation and radio processing.

Threads for processing each CB group may be placed into a task queue (indicated by capital 'Q' in FIG. 7) by e.g., the scheduler 2. In some embodiments, two or more parallel task queues may be provided, and each CB group may be placed into one of the parallel task queues based at least in part on hardware criteria. For example, CB groups may be placed into different task queues to facilitate parallel processing in the OSI L1 network node 22. For example, each task queue may be allocated to receive CB groups having a particular vectorization factor. Thus, a first task queue may be allocated to receive CB groups having a vectorization factor of 1; a second task queue may be allocated to receive CB groups having a vectorization factor of 2; a third task queue may be allocated to receive CB groups having a vectorization factor of 3, and so on. Other criteria for placing CB groups into task queues may be implemented, as desired. In some embodiments, since, for example, CB groups are sent to the OSI L1 network node 22, a single hardware processing element (for example one core of cores 0-n as shown in FIG. 7) may be assigned by the scheduler 2 to perform the L1 encoding process for a single corresponding CB group. Accordingly, grouping of CBs at L2 to optimize the input to the OSI L1 processing engine 28 can result in more efficient use of the L1 processing hardware (as compared to existing techniques) thereby decreasing processing latency, as shown in FIG. 8, by the line indicated as a CB-group interface. For example, when a CB group is received by the OSI L1 network node 22, data and context for processing the CB group can be localized to a single hardware processing element (e.g., a single core) to maximize data locality and instruction loading. Some embodiments may benefit from single threaded data locality (no core hopping). Some embodiments may also benefit from allowing parallelism of uncorrelated data. For example, each CB in a CB group may be operated on/processed in parallel by an SIMD core. Maximum parallelism at the "CB-group" level can allow for larger WD/UE allocations (as compared to use of existing techniques).

The particular hardware processing element of the OSI L1 processing engine 28 (for example core N of a multi-core processor) that is assigned to the CB group may perform one or more of the following steps for L1 encoding, as shown in FIG. 7: CRC on the CB group in step S302, vectorizing the CBs in the CB group in step S304, encoding each CB in the CB group using vector processing in step S306, de-vectorizing the CBs in the CB group in step S308, rate matching the CB group in step S310 and scrambling in step S312. In step S314, the OSI L1 network node 22 may send the output to the RU 3 for modulation and radio processing. The details for how to perform CRC, rate matching, scrambling and LDPC encoding are generally known in the art and are therefore not discussed in greater detail herein. Advantageously, by grouping CBs at L2 based on a hardware property of the OSI L1 processing engine (instead of sending TB s or merely sending ungrouped CBs), the input to the OSI L1 processing engine can be optimized to reduce processing latency.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
| --- | --- |
| CPRI | Common Public Radio Interface |
| DU | Digital Unit |
| RU | Radio Unit |

| Abbreviation | Explanation |
| --- | --- |
| RRU | Remote Radio Unit |
| RBS | Radio Base Station (eNodeB) |
| RAN | Radio Access Network |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method for a network node, the method comprising:
grouping, at an open systems interconnection, OSI, layer 2, L2, codeblocks, CBs, based at least in part on a hardware property associated with an OSI layer 1, L1, processing engine; and
sending the grouped CBs to the OSI L1 processing engine for CB group-level encoding.

2. The method of claim 1, further comprising:
receiving an indication of how to group the CBs; and
wherein the grouping the CBs further comprises grouping the CBs at the OSI L2 based at least in part on the received indication.

3. The method of claim 1, further comprising:
receiving an indication of a maximum number of CBs to be grouped together in a single CB group; and
wherein the grouping the CBs further comprises grouping a number of CBs together, the number of CBs grouped together based at least in part on the received indication.

4. The method of claim 1, wherein the hardware property includes a vectorization factor of the OSI L1 processing engine.

5. The method of claim 1, wherein the hardware property is associated with how many CBs matching at least one grouping criteria can be processed concurrently by the OSI L1 processing engine.

6. The method of claim 1, further comprising:
determining which of the CBs out of a plurality of CBs in a transport block, TB, can be grouped together for sending to the OSI L1 processing engine.

7. The method of claim 6, wherein determining which of the CBs out of the plurality of CBs in the TB can be grouped together for sending to the OSI L1 processing engine further includes:
determining which of the CBs correspond to a user equipment, UE; and
wherein the grouping the CBs further comprises grouping the determined CBs corresponding to the UE together for sending to the OSI L1 processing engine.

8. A method for a network node, the method comprising:
receiving, by an open systems interconnection, OSI, layer 1, L1, processing engine, a group of codeblocks, CBs, the CBs being grouped together based at least in part on a hardware property associated with the OSI L1 processing engine; and
performing CB group-level encoding on at least the received group of CBs.

9. The method of claim 8, further comprising:
sending an indication to an OSI layer 2, L2, node, the group of CBs being grouped together based at least in part on the indication.

10. The method of claim 9, wherein the indication indicates at least one of:
a maximum number of CBs to be grouped together in a single CB group;
how many CBs matching at least one grouping criteria can be processed concurrently by the OSI L1 processing engine; and
a vectorization factor of the OSI L1 processing engine.

11. The method of claim 8, wherein performing CB group-level encoding on at least the received group of CBs further comprises:
performing the CB group-level encoding on each of a plurality of CB groups in parallel.

12. The method of claim 11, wherein each CB group of the plurality of CB groups is encoded by a single processing hardware element.

13. A network node comprising processing circuitry, the processing circuitry configured to cause the network node to:
group, at open systems interconnection, OSI, layer 2, L2, codeblocks, CBs, based at least in part on a hardware property associated with an OSI layer 1, L1, processing engine; and
send the grouped CBs to the OSI L1 processing engine for CB group-level encoding.

14. The network node of claim 13, wherein the processing circuitry is further configured to cause the network node to:
receive an indication of how to group the CBs; and
group the CBs by being configured to group the CBs at the OSI L2 based at least in part on the received indication.

15. The network node of claim 13, wherein the processing circuitry is further configured to cause the network node to:
receive an indication of a maximum number of CBs to be grouped together in a single CB group; and
group the CBs by being configured to group a number of CBs together, the number of CBs grouped together based at least in part on the received indication.

16. The network node of claim 13, wherein the hardware property includes a vectorization factor of the OSI L1 processing engine.

17. The network node of claim 13, wherein the hardware property is associated with how many CBs matching at least one grouping criteria can be processed concurrently by the OSI L1 processing engine.

18. The network node of claim 13, wherein the processing circuitry is further configured to cause the network node to:
determine which of the CBs out of a plurality of CBs in a transport block, TB, can be grouped together for sending to the OSI L1 processing engine.

19. The network node of claim 18, wherein the processing circuitry is further configured to cause the network node to:
determine which of the CBs out of the plurality of CBs in the TB can be grouped together by being configured to determine which of the CBs correspond to a user equipment, UE; and
group the CBs by being configured to group the determined CBs corresponding to the UE together for sending to the OSI L1 processing engine.

20. A network node comprising processing circuitry, the processing circuitry configured to cause the network node to:
receive, by an open systems interconnection, OSI, layer 1, L1, processing engine, a group of codeblocks, CBs, the CBs being grouped together based at least in part on a hardware property associated with the OSI L1 processing engine; and
perform CB group-level encoding on at least the received group of CBs.

21. The network node of claim 20, wherein the processing circuitry is further configured to cause the network node to:
send an indication to an OSI layer 2, L2, node, the group of CBs being grouped together based at least in part on the indication.

22. The network node of claim 21, wherein the indication indicates at least one of:
a maximum number of CBs to be grouped together in a single CB group;
how many CBs matching at least one grouping criteria can be processed concurrently by the OSI L1 processing engine; and
a vectorization factor of the OSI L1 processing engine.

23. The network node of claim 20, wherein the processing circuitry is further configured to cause the network node to perform CB group-level encoding on at least the received group of CBs by being configured to cause the network node to:
perform the CB group-level encoding on each of a plurality of CB groups in parallel.

24. The network node of claim 23, wherein each CB group of the plurality of CB groups is encoded by a single processing hardware element.

* * * * *